(12) United States Patent
Sanschagrin et al.

(10) Patent No.: US 8,696,006 B2
(45) Date of Patent: Apr. 15, 2014

(54) LATERAL COVER FOR A WHEELED VEHICLE

(75) Inventors: Stephane Sanschagrin, Valcourt (CA); Daniel Nadeau, St-Denis de Brompton (CA); Richard Lefebvre, Shefford (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/700,532

(22) PCT Filed: May 31, 2010

(86) PCT No.: PCT/US2010/036789
§ 371 (c)(1),
(2), (4) Date: Nov. 28, 2012

(87) PCT Pub. No.: WO2011/152817
PCT Pub. Date: Dec. 8, 2011

(65) Prior Publication Data
US 2013/0087394 A1    Apr. 11, 2013

(51) Int. Cl.
*B60R 21/13*    (2006.01)
(52) U.S. Cl.
USPC .......................................................... 280/256
(58) Field of Classification Search
USPC .................. 280/756, 748, 749, 755; 296/147; 160/127
See application file for complete search history.

(56) References Cited

U.S. PATENT DOCUMENTS

| | | | |
|---|---|---|---|
| 3,961,585 A | 6/1976 | Brewer | |
| 4,906,020 A | 3/1990 | Haberer | |
| 7,125,069 B2 * | 10/2006 | Cacucci et al. | 296/190.03 |
| 7,556,291 B2 * | 7/2009 | Gale et al. | 280/749 |
| 7,618,081 B2 | 11/2009 | Rankin et al. | |
| 8,292,352 B2 * | 10/2012 | Furman et al. | 296/190.03 |
| 8,328,235 B2 * | 12/2012 | Schneider et al. | 280/748 |
| 8,465,050 B1 * | 6/2013 | Spindler et al. | 280/749 |
| 2002/0096900 A1 | 7/2002 | Moore | |
| 2008/0023240 A1 | 1/2008 | Sunsdahl et al. | |
| 2009/0243339 A1 | 10/2009 | Orr et al. | |

OTHER PUBLICATIONS

International Search report from PCT/US2010/036789 issued Aug. 2, 2010; Blaine R. Copenheaver.

* cited by examiner

*Primary Examiner* — Faye M. Fleming
(74) *Attorney, Agent, or Firm* — BCF LLP

(57) ABSTRACT

A vehicle has a cockpit area and lateral passages for the ingress and egress of a rider to and from the cockpit area. At least one lateral flexible cover selectively extends at least partially across at least one of the lateral passages. The cover has at least one upper attachment point connected to the roll cage, at least one lower attachment point connected to one of the frame and the roll cage, and a forward attachment point selectively connected to one of the frame and the roll cage. When the forward attachment point is connected to the one of the frame and the roll cage, the at least one lateral flexible cover extends forwardly and downwardly from the at least one upper attachment point to the forward attachment point, and forwardly and upwardly from the at least one lower attachment point to the forward attachment point.

18 Claims, 7 Drawing Sheets

LATERAL COVER FOR A WHEELED VEHICLE

TECHNICAL FIELD

The present invention relates generally to a wheeled vehicle and, more particularly, to a lateral cover for a four-wheeled vehicle having an open cockpit area.

BACKGROUND

Recreational utility vehicles (RUVs) generally have an open cockpit area with side-by-side seating. They are often referred to as side-by-side All-Terrain Vehicles (ATVs).

The open cockpit area is protected by a roll cage disposed above the cockpit area. The driver and the passenger enter and exit (ingress and egress) the vehicle through lateral passages, as is traditionally done on automobiles.

During driving, there are risks associated with open cockpit areas and open lateral passages.

Therefore, there is a need for a system that would contribute to protecting the driver and the passenger while keeping the enjoyment of riding an off-road vehicle without the constraints of a full enclosed cabin.

SUMMARY

In one aspect, a vehicle has a frame, a cockpit area defined in the frame, and a roll cage connected to the frame. The roll cage covers at least in part the cockpit area. Two seats are disposed side-by-side in the cockpit area. The two seats are covered by the roll cage. Each of the two seats are adapted to support a rider. An engine is supported by the frame. Two front wheels and two rear wheels are supported by the frame. At least two of the wheels are operatively connected to the engine for propelling the vehicle. A steering device is disposed generally forward of the two seats. The steering device is operatively connected to at least two of the wheels for steering the vehicle. The cockpit area is disposed between two lateral sides of the vehicle. Each of the two lateral sides comprises a lateral passage disposed adjacent to the two seats. The lateral passage is adapted to allow ingress and egress of the rider to and from the cockpit area. At least one lateral flexible cover selectively extends at least partially across at least one of the lateral passages. The at least one lateral flexible cover has at least one upper attachment point connected to the roll cage. At least one lower attachment point is connected to one of the frame and the roll cage. The at least one lower attachment point is vertically lower than the at least one upper attachment point. A forward attachment point is selectively connected to one of the frame and the roll cage. The forward attachment point connects to the one of the frame and the roll cage at a position longitudinally forward of the at least one upper attachment point and the at least one lower attachment point. When the forward attachment point is connected to the one of the frame and the roll cage, the at least one lateral flexible cover extends forwardly and downwardly from the at least one upper attachment point to the forward attachment point, and forwardly and upwardly from the at least one lower attachment point to the forward attachment point.

In an additional aspect, a connector is at the forward attachment point. The connector is operable by a single hand of the rider to selectively connect the forward attachment point to the one of the frame and the roll cage.

In a further aspect, the at least one lateral flexible cover is made of a plurality of flexible straps and at least one flexible panel connected to the plurality of flexible straps.

In an additional aspect, the at least one flexible panel is at least one mesh panel.

In a further aspect, the plurality of flexible straps is disposed across the at least one lateral flexible cover to provide support to the at least one mesh panel.

In an additional aspect, the at least one upper attachment point comprises a forward upper attachment point and a rearward upper attachment point. The forward upper attachment point is connected to an upper lateral part of the roll cage. The rearward upper attachment point is connected to a rear lateral part of the roll cage. The rearward upper attachment point is vertically lower than and longitudinally rearward of the forward upper attachment point.

In a further aspect, the vehicle further comprises an attachment strap separate from the at least one lateral flexible cover. The attachment strap has a first end and a second end. The first end is selectively connected to the forward attachment point. The second end is connected to the frame forwardly of the at least one lower attachment point.

In an additional aspect, the at least one lateral flexible cover further comprises at least one attachment point connected to a lateral restraining member. The lateral restraining member is connected to a rear lateral part of the roll cage. The lateral restraining member extends forward from the rear lateral part of the roll cage. The lateral restraining member extends partially into the lateral passage.

In a further aspect, the at least one upper attachment point and the at least one lower attachment point are located longitudinally between a forwardmost point of the two seats and a rearwardmost point of the two seats.

In an additional aspect, the at least one lower attachment point is longitudinally forward of the at least one upper attachment point.

In a further aspect, the at least one lateral flexible cover includes a corner area, the corner area having an apex at the forward attachment point.

In an additional aspect, the corner area includes at least one semi-rigid plastic part covering at least a portion of the corner area.

In a further aspect, the forward attachment point includes a buckle. The corner area defines an aperture in the at least one lateral flexible cover.

In an additional aspect, the aperture is adapted to receive at least one finger of the rider therethrough for operating the buckle.

In a further aspect, when the forward attachment point is disconnected from the one of the frame and the roll cage, the at least one lateral flexible cover falls by gravity to a position where the apex is vertically lower than and longitudinally rearward of the position where the forward attachment point is connected to the one of the frame and the roll cage.

In a further aspect, at least one of the plurality of flexible straps includes a stretchable portion.

In an additional aspect, the at least one lateral flexible cover includes a corner area. The corner area has an apex at the forward attachment point. The at least one of the plurality of flexible straps including a stretchable portion is connected to the apex.

For purposes of this application the term "recreational utility vehicle" (RUV) refers to an "opened" wheeled vehicle (contrary to a pickup truck which is a "closed" vehicle due to its closed passenger cabin) designed for off-road use which usually has side-by-side seating.

The term 'mesh' refers to a material that has a plurality of apertures to allow wind flow through it. In some cases, the mesh material is see through. The apertures of the mesh material can have various shapes and sizes. The mesh material does not need to be a unitary piece of fabric. For example, a mesh material could be formed of several pieces arranged in a grid.

The term 'flexible' refers to a material that is non rigid, that is capable of bending. A flexible material can be folded. A flexible material may accept some deformation.

The term 'stretchable' refers to a material that is capable of elongating in length upon application of a tensioning force. For example, an elastic is stretchable.

Also, terms related to spatial orientation such as forwardly, rearwardly, frontal, rear, upper, lower, left, and right, are as they would normally be understood by a driver of the vehicle sitting thereon in a normal driving position.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

Further features and advantages of the present invention will become apparent from the following detailed description, taken in combination with the appended drawings, in which.

DETAILED DESCRIPTION

The present lateral cover will be described with respect to a recreational utility vehicle (RUV). However it should be understood that the present lateral cover could be used on other types of off-road vehicles having an open cockpit area.

Figure 1:
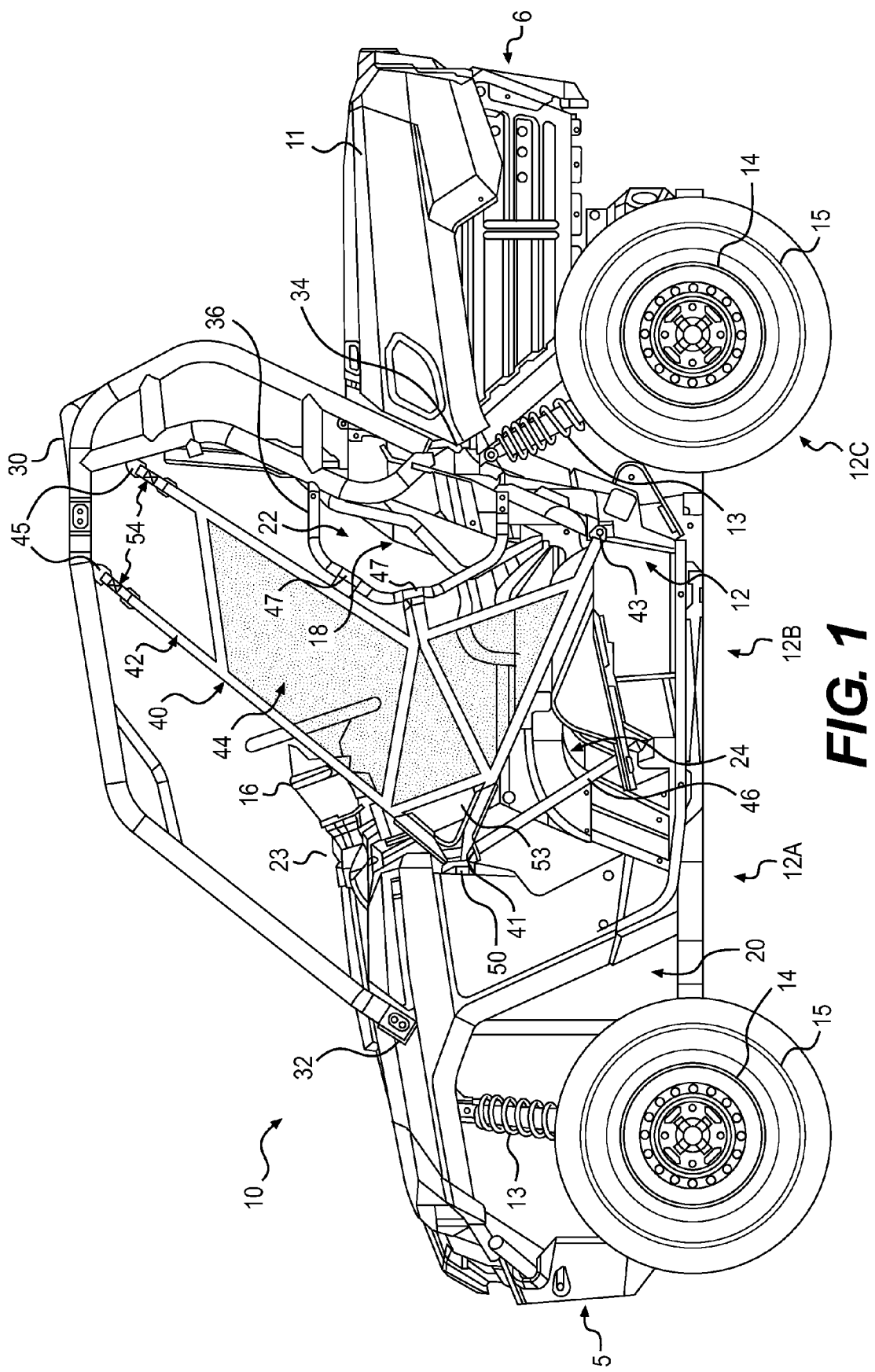
FIG. 1 is a left side elevation view of an RUV, with fairings partially removed for clarity, having a lateral cover.
Figure 2:
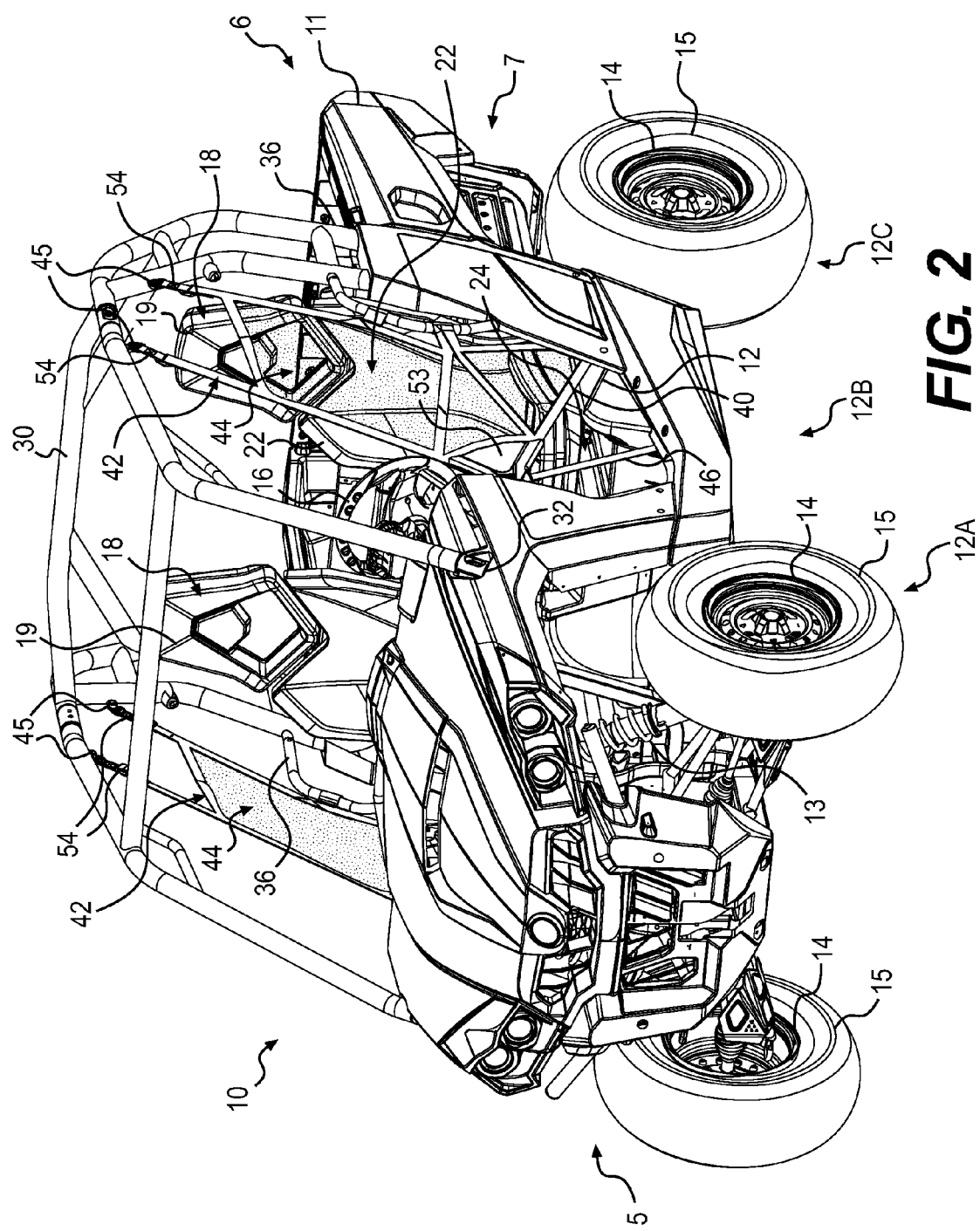
FIG. 2 is a perspective view, taken from a front left side, of the RUV of FIG. 1.
Figure 3:
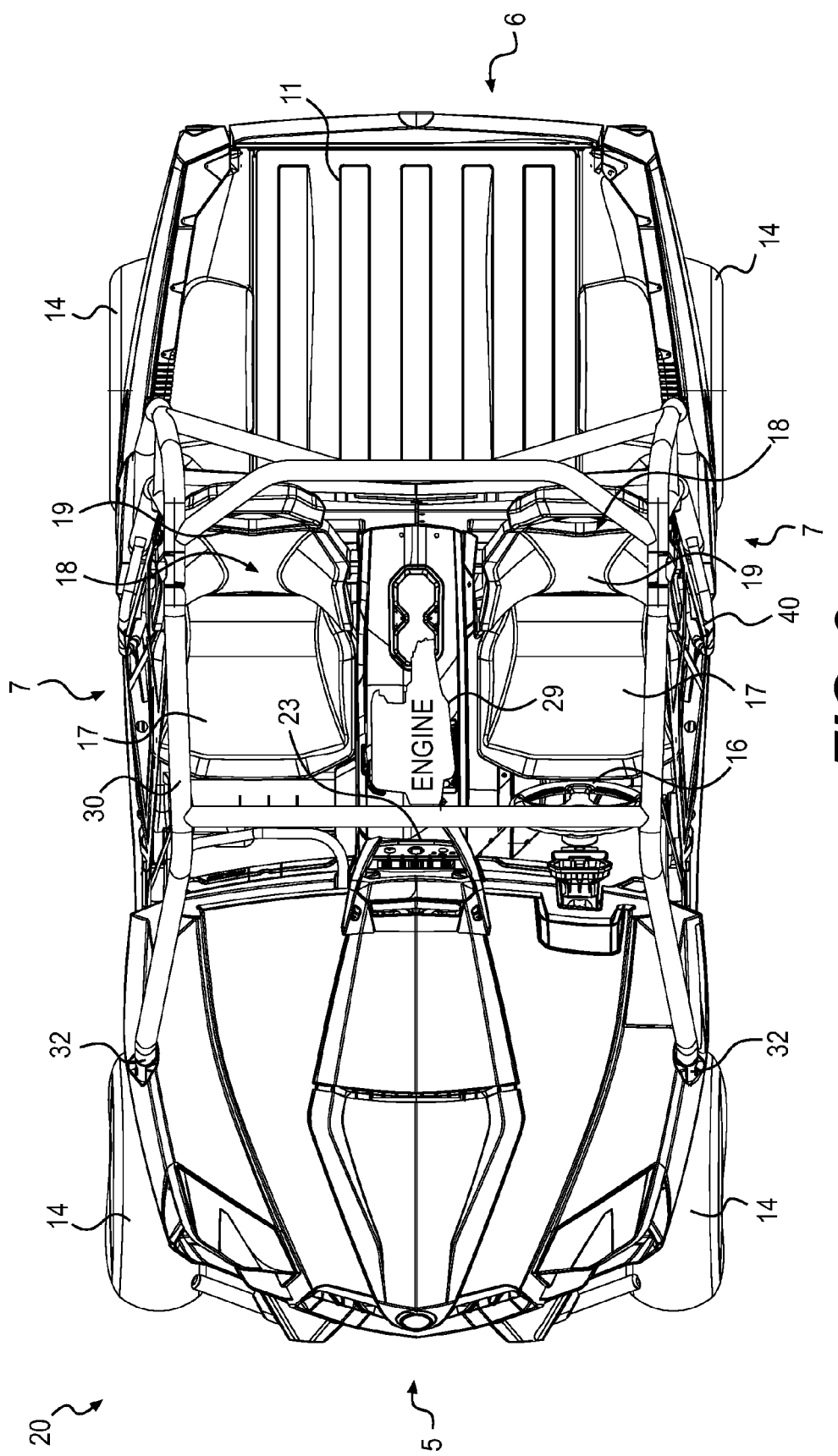
FIG. 3 is a top plan view of the RUV of FIG. 1.

FIGS. 1 to 3 illustrate an RUV 10 having a front end 5 a rear end 6, and two lateral sides 7 (left and right). The RUV 10 includes a frame 12 to which a vehicle body is mounted. The frame 12 has a front portion 12A, a middle portion 12B and a rear portion 12C. A pair of front wheels 14 is suspended from the front portion 12A of the frame 12 via front suspension 13. A pair of rear wheels 14 is suspended from the rear portion 12C of the frame 12 via rear suspension 13. Each of the four wheels 14 has a tire 15. It is contemplated that the RUV 10 could have six or more wheels. A cockpit area 22 is disposed in the middle portion 12B of the frame 12. The cockpit area 22 comprises two seats 18 (left and right). Each seat 18 has a seat base 17 and a backrest 19. The seats 18 are mounted laterally beside each other to accommodate a driver and a passenger (riders) of the RUV 10. The seats 18 are bucket seats. It is contemplated that the seats 18 could be other types of recumbent seats. The cockpit area 22 is open at the two lateral sides 7 of the RUV 10, forming two lateral passages 24 (left and right), through which the riders can ingress and egress the RUV 10. A lateral cover 40 is selectively disposed across each lateral passages 24. The lateral cover 40 extends vertically from the roll cage 30 to a point vertically lower than the seat base 17. It is contemplated that only one of the two lateral passages 24 could be selectively partially covered by a lateral cover 40. The lateral covers 40 are made of flexible straps 42 and flexible panels 44 of meshed material. As it will be explain below, when the riders are riding the RUV 10, the lateral cover 40 is intended to be disposed across the lateral passage 24. However, when the riders are not riding the RUV 10 and they desire either ingress or egress the cockpit area 22, the lateral cover 40 can be opened to clear the lateral passage 24.

A roll cage 30 is connected to the frame 12 and is disposed above the cockpit area 22. The roll cage 30 is an arrangement of metal tubes which contributes to protecting the riders in the event the vehicle rolls over. The roll cage 30 has several attachment points to the frame 12. Toward the front 5 of the RUV 10, the roll cage 30 connects to the cowlings at front attachment points 32 (left and right). The front attachment points 32 are located longitudinally between a roll axis of the front wheels 14 and a forwardmost point 17 of the seats 18. Toward the rear 6 of the RUV 10, the roll cage 30 connects to the frame 12 at rear attachment points 34 (left and right). The rear attachment points 34 are located longitudinally between a roll axis of the rear wheels 14 and the a rearwardmost point of the seat base 17 of the seats 18. The roll cage 30 further includes a pair of lateral restraining members 36, one on each side of a rear part of the roll cage 30. The lateral restraining members 36 extend forward from the rear part of the roll cage 30 partially into the lateral passages 24. The lateral restraining members 36 are U-shaped tubes which protect an upper body of the riders during leaning or roll-over. It is contemplated that the lateral restraining members 36 could have a different shape. It is also contemplated that the restraining members 36 could be omitted.

A steering assembly 16 including a steering wheel is disposed in front of the left seat 18. It is contemplated that, the steering wheel could be disposed in front of the right seat 18. The steering assembly 16 is operatively connected to the two front wheels 14 to permit steering of the RUV 10. An engine 29, shown schematically in dotted lines in FIG. 3, is mounted to the middle portion 12B of frame 12 between the right and the left seats 18. The engine 29 is operatively connected to the four wheels 14 to power the RUV 10. It is contemplated that the engine 29 could be operatively connected only to the front wheels 14 or only to the rear wheels 14. A cargo box 11 is pivotally mounted to the frame 12 rearwardly of the seats 18. It is contemplated that the cargo box 11 could be omitted. A console 23, positioned between the right and left seats 18 covers and separates the engine 29 from the driver and the passenger. The RUV 10 has other features and components such as headlights and handles. As it is believed that these features and components would be readily recognized by one of ordinary skill in the art, further explanation and description of these components will not be provided herein.

Figure 4:
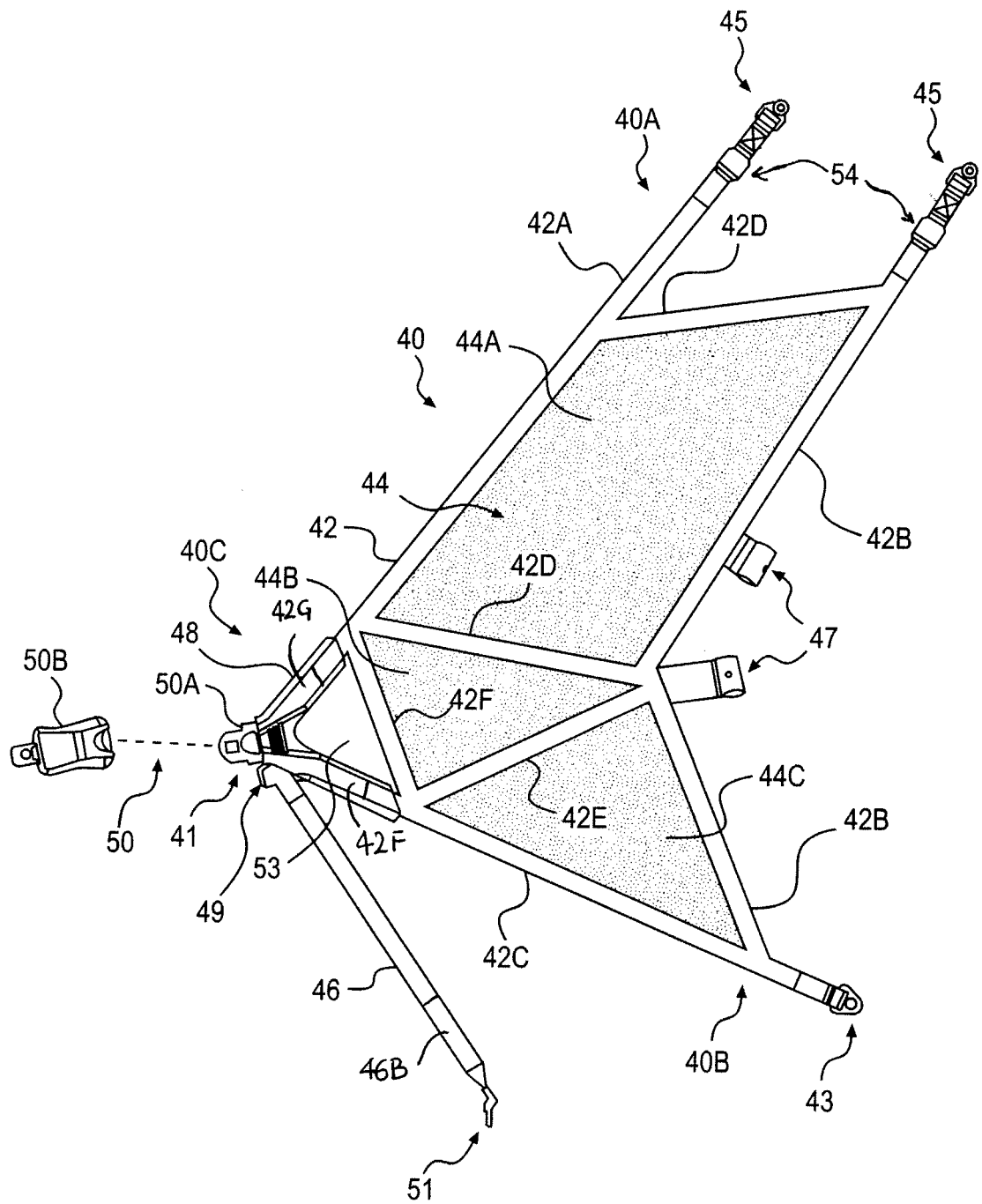
FIG. 4 is a left side elevation view of the lateral cover for the RUV of FIG. 1.

Referring now to FIG. 4, the lateral cover 40 will be described in greater details. The lateral cover 40 will be described only with respect to the lateral cover 40 covering the left lateral passage 24 of the RUV 10 a shown in FIG. 4. The lateral cover 40 for the right lateral passage 24 being a mirror image of the one for the left lateral passage 24.

The lateral cover 40 has a general triangular shaped body having three attachment areas 40A, 40B, 40C with areas 40B and 40C being corner areas. The attachment areas 40A, 40B, 40C define three sides of the lateral cover 40. A first side is defined between the attachment area 40A and the attachment area 40C. A second side is defined between the attachment area 40A and the attachment area 40B. A third is defined between the attachment areas 40B and the attachment area 40C. The first side is longer than the second side, and the second side is longer than the third side. It is contemplated that the second side could be longer than the first side, and the first side could longer than the third side.

At the attachment area 40A, the lateral cover 40 connects to the roll cage 30 via two upper attachment points 45. At the attachment area 40B, the lateral cover 40 connects to the frame 12 via a lower attachment point 43. At the attachment area 40C, the lateral cover 40 selectively connects to the frame 12 via a forward attachment point 41. The attachment area 40C includes an apex 49, and the forward attachment point 41 is located at the apex 49. The lateral cover 40 extends forwardly and downwardly from the upper attachment points 45 to the forward attachment point 41, and extends forwardly and upwardly from the lower attachment point 43 to the forward attachment point 41. One of the upper attachment points 45 is located longitudinally between the lower attachment point 43 and the forward attachment point 41. It is contemplated that the lateral cover 40 could be connected to the roll cage 30 at one or more than three attachment points 45. It is contemplated that two or more lower attachment points 43 could be used to connect the second corner 40B to the frame 12. It is contemplated that the two upper attachment points 45 could be located longitudinally between the lower attachment point 43 and the forward attachment point 41. It is also contemplated that the lower attachment point 43 could be located longitudinally between the two upper attachment points 45 and the forward attachment point 41.

Two additional attachment points 47 connect the lateral cover 40 to the lateral restraining member 36. It is contemplated that only one or more or no additional attachment points 47 could be used to secure the lateral cover 40 to the RUV 10. It is also contemplated that the additional attachment points 47 could connect to the roll cage 30 itself.

The lateral cover 40 is mounted to the RUV 10 via strap holders which are fixed to the roll cage 30 via nuts and bolts at the attachment points 43 and 45, and via tubes formed in the straps at the additional attachment points 47. It is contemplated that the lateral cover 40 could be mounted to the RUV 10 by other means.

The lateral cover 40 is selectively disposed across the lateral passage 24 via the forward attachment point 41. A buckle 50 at the forward attachment point 41 is used to selectively close the lateral cover 40. The buckle 50 has a female portion 50B connected to the frame 12, and a male portion 50A connected to the lateral cover 40 at the apex 49. To open and close the lateral cover 40, as it will be described in greater details below, the rider selectively engages the male portion 50A into the female portion 50B by inserting his fingers into the aperture 53 and securing them around the corner area 40C.

A semi-rigid sleeve 48 is disposed around a portion of the flexible straps 42 at the corner area 40C. The semi-rigid sleeve 48 is a plastic sleeve that gives some rigidity to the corner area 40C around the aperture 53 for ease of handling during opening and closing of the lateral cover 40. It is contemplated that the sleeve 48 could be completely rigid. It is also contemplated that the semi-rigid sleeve 48 could be flexible. It is contemplated that the semi-rigid sleeve 48 could be made of a material other than plastic. It is also contemplated that the semi-rigid sleeve 48 could be omitted.

The generally triangular shaped body of the lateral cover 40 is made of a plurality of flexible straps 42 and flexible panels 44 of mesh material (schematically illustrated with stippled shading in FIGS. 1 to 2 and 4 to 7).

Figure 5:
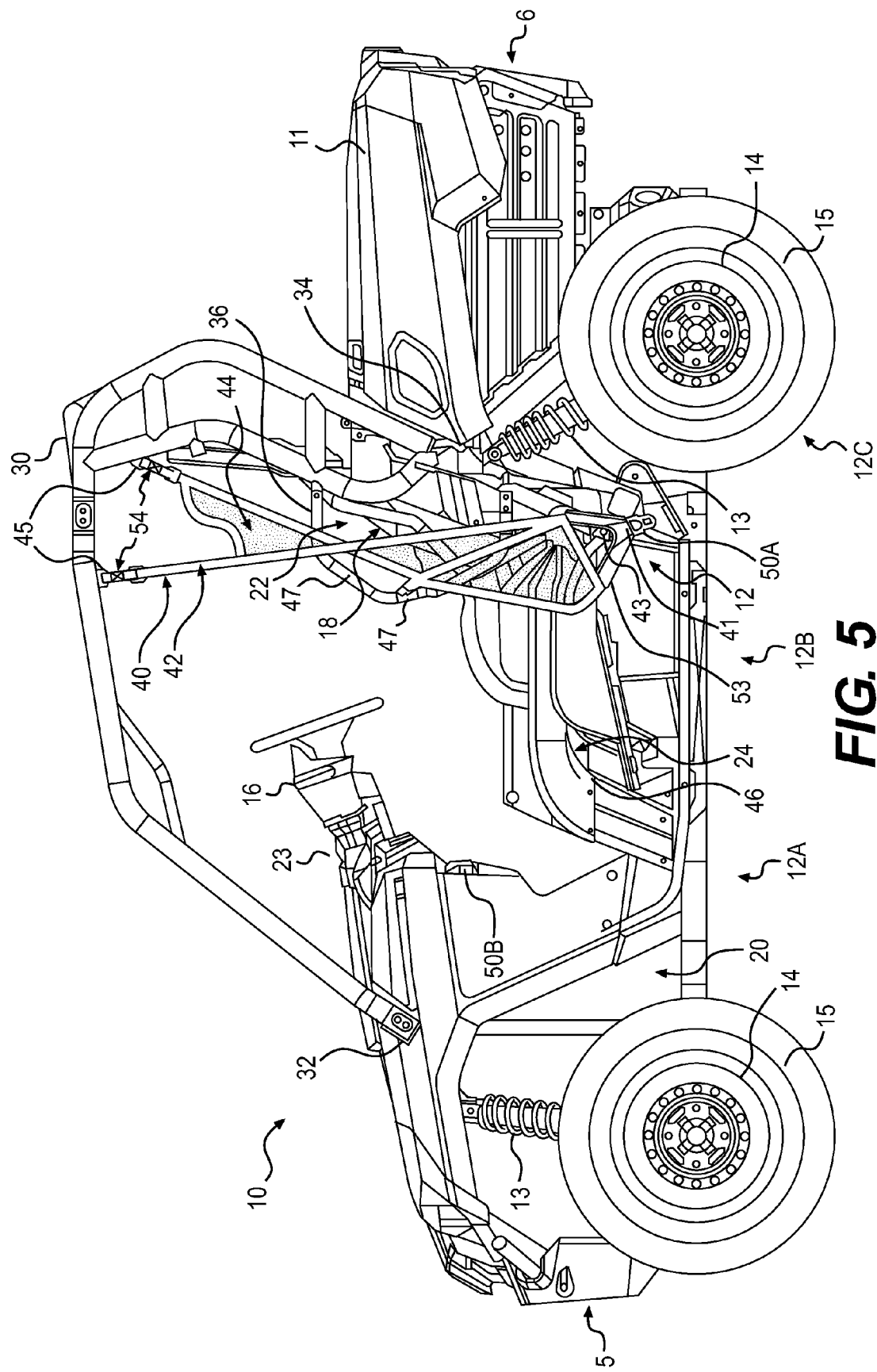
FIG. 5 is a left side elevation view of the RUV of FIG. 1 with the lateral cover in an open position.
Figure 6:
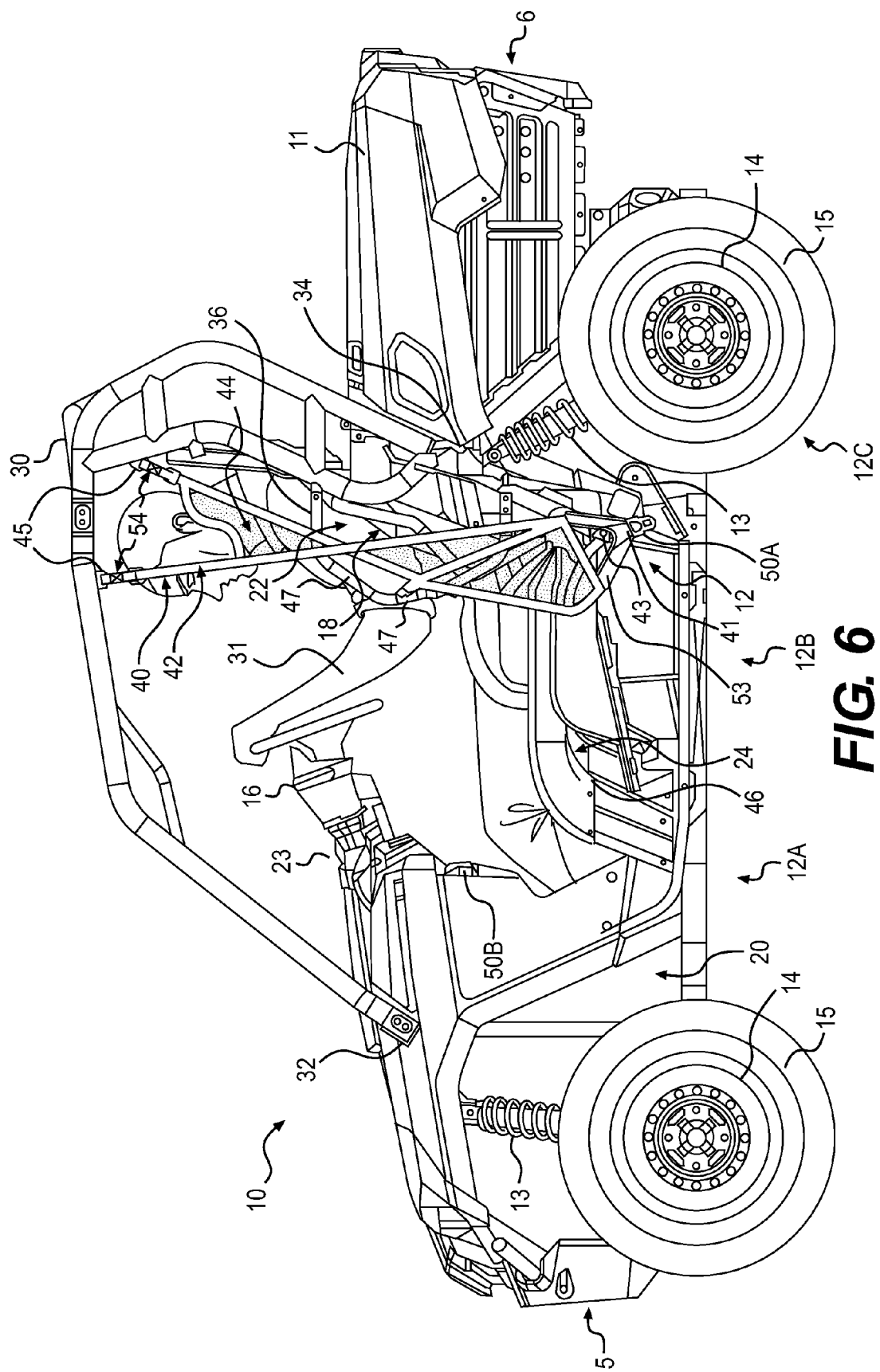
FIG. 6 is a left side elevation view of the RUV of FIG. 5 with a rider seated therein.

The flexible straps 42 are polyester straps dimensioned so that the lateral cover 40 is disposed tight across the lateral passage 24. The flexible straps 42 are flexible enough to move freely downwards by gravity when the lateral cover 40 is not disposed across the lateral passage 24 (as shown in FIGS. 5 and 6). The polyester material of the flexible straps 42 does not stretch considerably. As will be shown below, some of the flexible straps 42 are provided with stretchable portions. It is contemplated that the flexible straps 42 could be made of a different material. It is also contemplated that the flexible straps 42 could stretch by a small amount.

A first flexible strap 42A forms the first side of the generally triangular shaped body of the lateral cover 40. Two second flexible straps 42B (upper and lower) form the second side of the lateral cover 40. A third flexible strap 42C forms the third side of the lateral cover 40. It is contemplated that only one second flexible strap 42B could be used to form the second side. It is also contemplated that more than two second flexible straps 42B could be used to form the second side, and more than one first flexible strap 42A and more than one third flexible strap 42C could be used to form the first side and the third side, respectively, of the lateral cover 40.

Two intermediate flexible straps 42D (upper and lower) extend between the first flexible strap 42A and the two second flexible straps 42B. The upper intermediate flexible strap 42D connects the first flexible strap 42A and the lower strap of the two second flexible straps 42B. The lower intermediate flexible strap 42D connects the first flexible strap 42A and the two second flexible straps 42B where the two second flexible straps 42B meet.

An intermediate flexible strap 42E extends between the third flexible strap 42C and the two second flexible straps 42B where two second flexible straps 42B meet.

An intermediate flexible strap 42F extends between the third flexible strap 42C and the first flexible straps 42A.

The flexible straps 42A and 42B (upper one) each include a strap adjuster 54. The strap adjusters 54 allow to adjust a length of the flexible straps 42A, 42B (upper), and therefore to adjust a tension of the flexible straps 42A, 42B (upper). It is contemplated that the strap adjusters 54 could be omitted.

The first flexible strap 42A and the third flexible strap 42C each have a stretchable portion 42G, 42F, respectively. The stretchable portions 42G, 42F allow the rider to close the lateral cover 40 in cases where the lateral cover 40 would be adjusted too tight at the strap adjusters 54 and the male part 50A of the buckle 50 could not reach the female part 50B. The stretchable portions 42G, 42F are located at the corner area 40C and are covered by the semi-rigid sleeve 48. It is contemplated that the stretchable portions 42G, 42F could be located anywhere along the first flexible strap 42A and the third flexible strap 42C. It is also contemplated that only one or more of the stretchable portions 42G, 42F could be used. It is also contemplated that the stretchable portions 42G, 42F could be omitted.

The lateral cover 40 has an aperture 53 in the corner area 40C. The aperture 53 is triangular and is formed by the third intermediate flexible strap 42E, a portion of the first flexible strap 42A extending between the third intermediate flexible strap 41C and the apex 49, and a portion of the third flexible strap 42C extending between the third intermediate flexible strap 42E and the apex 49.

A flexible strap 46, separate from the lateral cover 40, connects the lateral cover 40 to an attachment point 51. The flexible strap 46 is a strap that provides an additional retention means for the feet of the riders. The flexible strap 46 extends from the forward attachment point 41 to the attachment point 51. The attachment point 51 is located longitudinally forward of the lower attachment point 43 and longitudinally rearward of the forward attachment point 41. It is contemplated that the flexible strap 46 could be omitted. It is also contemplated that the flexible strap 46 could be part of the lateral cover 40 and be connected to the lateral cover 40 by a flexible panel 44.

The flexible strap 46 has a stretchable portion 46B. The stretchable portion 46B is similar to the stretchable portions 42G, 42F of the first flexible strap 42A and the third flexible strap 42C respectively. The stretchable portion 46B is located near the attachment point 51. It is contemplated that the stretchable portion 46B could be located anywhere along the flexible strap 46. It is also contemplated that only no or more than one stretchable portion 46 could be used.

The arrangement of the plurality of flexible straps 42 defines areas where the flexible panels 44 are disposed thereonto. There are three flexible panels 44, namely upper panel 44A, middle panel 44B, and lower panel 44C. It is contemplated that more or less than three flexible panels 44 could be used. It is also contemplated that the flexible straps 42 could define only zones where a flexible panel should be disposed thereon, and that the flexible panel 44 would be a single flexible panel covering the zones defined by the flexible straps 42.

The flexible panels 44 are made of 200 denier nylon. The flexible panels 44 are dimensioned so that the lateral cover 40 is disposed tight across the lateral passage 24. The flexible panels 44 are made of a meshed material that allows the driver and the passenger to see through it and let wind blow through.

The upper flexible panel 44A has a generally parallelogram shape, and is defined by the first flexible strap 42A, the two intermediate flexible straps 42D and the upper flexible strap of the two second flexible straps 42B. The upper flexible panel 44A has a highest point at about a highest point of the backrest 19.

The middle flexible panel 44B has a triangular shape, and is defined by a lower strap of the two intermediate flexible straps 42D, the intermediate flexible straps 42E, and the intermediate flexible straps 42F.

The lower flexible panel 44C has a triangular shape, and is defined by the intermediate flexible straps 42E, the third flexible strap 42C, and the lower strap of the two flexible straps 42B.

Figure 7:
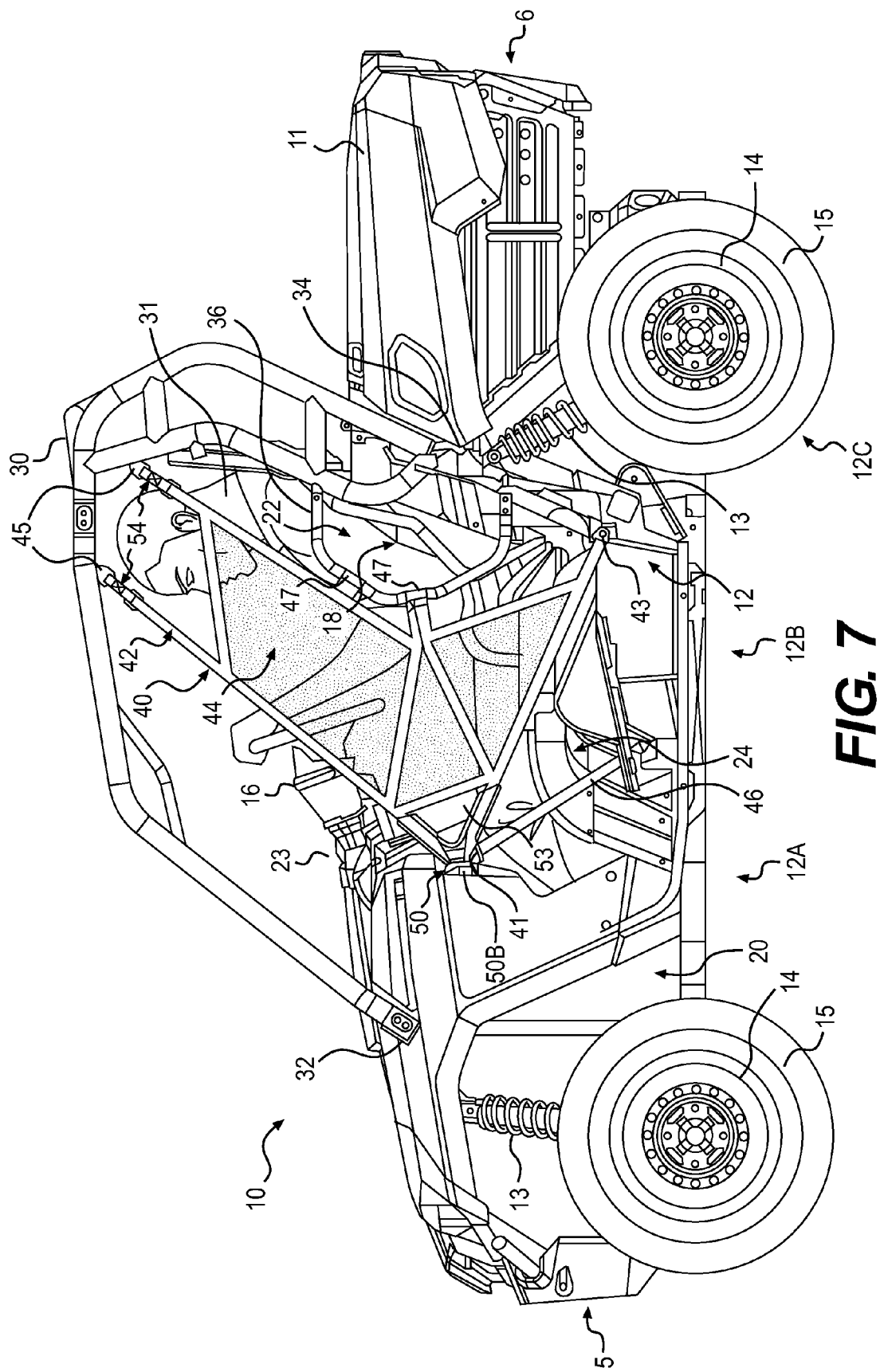
FIG. 7 is a left side elevation view of the RUV of FIG. 6 with the lateral cover in a closed position.

Referring now to FIGS. 5 to 7, a mode of operation of the lateral cover 40 will be described.

The rider desiring to ingress the RUV 10 opens the lateral cover 40, if not already done. To do so, the rider disconnects the lateral cover 40 at the forward attachment point 41 from the vehicle, by detaching the male part 50A from the female part 50B of the buckle 50. More specifically, the rider positions one or more fingers through the aperture 53 to reach the male part 50A. The rider presses a button on the female part 50B to release the male part 50A from the female part 50B. It is contemplated that the button could be located on the male part 50A. The rider removes his fingers from the aperture 53. The male part 50A of the buckle 50 swings backwards to be vertically aligned about the upper attachment points 45. The lateral cover 40, as shown in FIG. 5, moves into a compact position that clears up the lateral passage 24.

Once the lateral cover 40 is out of the way of the lateral passage 24, the rider ingresses the cockpit area 22 and sits on the seat 18, as shown in FIG. 6. Before riding the RUV 10, the rider closes the lateral cover 40. To do so, the rider reaches for the male part 50A of the buckle 50, and brings it in contact with the female part 50B by extending his arm. It is contemplated that the rider may have to lean his body slightly forward to reach the buckle 50. To connect the male part 50A and the female part 50B, the rider puts his fingers through the aperture 53, while grabbing partially the semi-rigid sleeve 48 with the thumb on an opposite side. The rider, still having his fingers around the semi-rigid sleeve 48, extends the lateral cover 40 across the lateral passage 24 when reaches the female part 50B of the buckle 50 with the male part 50A. In cases where the lateral cover 40 is adjusted too tight at the strap adjusters 54 for the male part 50A to easily reach the female part 50B, the flexible straps 42A, 42C and 46 elongate (compared to their length when undergoing no tension) when the rider tensions the lateral cover 40 by reaching for the female part 50B. As described above, the stretchable parts 42F, 42G and 46B of the flexible straps 42A, 42C and 46 provide the elongation. The rider engages the male part 50A into the female part 50B to secure the lateral cover 40 across the lateral passage 24. As illustrated in FIG. 7, at the end of the operation the lateral cover 40 is positioned across the lateral passage 24 and protects the rider.

To exit the RUV 10, the rider disconnects the lateral cover 40 from the vehicle at the forward attachment point 41. To do so, the rider grabs the buckle 50, puts his fingers through the aperture 53, and presses the button of the female part 50B to detach the male part 50A from the female part 50B. The lateral cover 40 swings downwards and rearwards due to the weight of the buckle 50 and the semi-rigid sleeve 48, thereby freeing the lateral passage 24. The rider egresses the cockpit area 22 through the lateral passage 24.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   a frame;
   a cockpit area defined in the frame;
   a roll cage connected to the frame, the roll cage covering at least in part the cockpit area;
   two seats disposed side-by-side in the cockpit area, the two seats being covered by the roll cage, each of the two seats being adapted to support a rider;
   an engine supported by the frame;
   two front wheels and two rear wheels supported by the frame, at least two of the wheels being operatively connected to the engine for propelling the vehicle;
   a steering device disposed generally forward of the two seats, the steering device being operatively connected to at least two of the wheels for steering the vehicle, the steering device including a steering wheel;
   two lateral sides, the cockpit area being disposed between the two lateral sides, each of the two lateral sides comprising a lateral passage disposed adjacent to the two seats, the lateral passage being adapted to allow ingress and egress of the rider to and from the cockpit area; and
   at least one lateral flexible cover selectively extending at least partially across at least one of the lateral passages, the at least one lateral flexible cover having:
      at least one upper attachment point connected to the roll cage, each of the at least one upper attachment point being longitudinally rearward of the steering wheel;
      at least one lower attachment point connected to one of the frame and the roll cage, each of the at least one lower attachment point being vertically lower than all of the at least one upper attachment point, each of the at least one lower attachment point being longitudinally rearward of the steering wheel; and a forward attachment point selectively connected to one of the frame and the roll cage, the forward attachment point connecting to the one of the frame and the roll cage at a position longitudinally forward of all of the at least one upper attachment point and all of the at least one lower attachment point, wherein, when the forward attachment point is connected to the one of the frame and the roll cage, the at least one lateral flexible cover extends forwardly and downwardly from the at least one upper attachment point to the forward attachment point, and forwardly and upwardly from the at least one lower attachment point to the forward attachment point; and when the forward attachment point is disconnected from the one of the frame and the roll cage, the at least one lateral flexible cover falls by gravity to a position where the forward attachment point is longitudinally rearward of the steering wheel.

2. The vehicle of claim 1, further comprising a connector at the forward attachment point, the connector being operable by a single hand of the rider to selectively connect the forward attachment point to the one of the frame and the roll cage.

3. The vehicle of claim 1, wherein the at least one lateral flexible cover is made of a plurality of flexible straps and at least one flexible panel connected to the plurality of flexible straps.

4. The vehicle of claim 3, wherein the at least one flexible panel is at least one mesh panel.

5. The vehicle of claim 4, wherein the plurality of flexible straps is disposed across the at least one lateral flexible cover to provide support to the at least one mesh panel.

6. The vehicle of claim 1, wherein:
the at least one upper attachment point comprises a forward upper attachment point and a rearward upper attachment point,
the forward upper attachment point is connected to an upper lateral part of the roll cage, and
the rearward upper attachment point is connected to a rear lateral part of the roll cage, the rearward upper attachment point being vertically lower than and longitudinally rearward of the forward upper attachment point.

7. The vehicle of claim 1, further comprising an attachment strap separate from the at least one lateral flexible cover, the attachment strap having a first end and a second end, the first end being selectively connected to the forward attachment point and the second end being connected to the frame forwardly of the at least one lower attachment point.

8. The vehicle of claim 1, wherein the at least one lateral flexible cover further comprises at least one attachment point connected to a lateral restraining member, the lateral restraining member being connected to a rear lateral part of the roll cage, the lateral restraining member extending forward from the rear lateral part of the roll cage, the lateral restraining member extending partially into the lateral passage.

9. The vehicle of claim 1, wherein the at least one upper attachment point and the at least one lower attachment point are located longitudinally between a forwardmost point of the two seats and a rearwardmost point of the two seats.

10. The vehicle of claim 1, wherein the at least one lower attachment point is longitudinally forward of at least one of the at least one upper attachment point.

11. The vehicle of claim 1, wherein the at least one lateral flexible cover includes a corner area, the corner area having an apex at the forward attachment point.

12. The vehicle of claim 11, wherein the corner area includes at least one semi-rigid plastic part covering at least a portion of the corner area.

13. The vehicle of claim 11, wherein:
the forward attachment point includes a buckle, and
the corner area defines an aperture in the at least one lateral flexible cover.

14. The vehicle of claim 13, wherein the aperture is adapted to receive at least one finger of the rider therethrough for operating the buckle.

15. The vehicle of claim 11, wherein when the forward attachment point is disconnected from the one of the frame and the roll cage, the at least one lateral flexible cover falls by gravity to a position where the apex is vertically lower than and longitudinally rearward of the position where the forward attachment point is connected to the one of the frame and the roll cage.

16. The vehicle of claim 3, wherein at least one of the plurality of flexible straps includes a stretchable portion.

17. The vehicle of claim 16, wherein:
the at least one lateral flexible cover includes a corner area,
the corner area has an apex at the forward attachment point, and
the at least one of the plurality of flexible straps including a stretchable portion is connected to the apex.

18. The vehicle of claim 1, wherein each of the at least one lower attachment point is longitudinally rearward of a forwardmost of the at least one upper attachment point.

\* \* \* \* \*